United States Patent [19]

Fenimore et al.

[11] Patent Number: 5,329,966
[45] Date of Patent: Jul. 19, 1994

[54] GAS FLOW CONTROLLER

[75] Inventors: David C. Fenimore, Sierra Madre; Walter H. McHenry, Covina; James L. Blumberg, Sylmar, all of Calif.

[73] Assignee: Vici Metronics Incorporated, Duarte, Calif.

[21] Appl. No.: 27,383

[22] Filed: Mar. 8, 1993

[51] Int. Cl.⁵ ............... F16K 31/365; F16K 31/04
[52] U.S. Cl. .................... 137/613; 137/501; 137/614.19
[58] Field of Search .............. 137/613, 501, 505.42, 137/625.65, 614.19, 614.2, 614.21, 614.11, 487.5

[56] References Cited

U.S. PATENT DOCUMENTS

| | | | |
|---|---|---|---|
| 2,067,229 | 1/1937 | Birch | 137/613 X |
| 2,565,560 | 8/1951 | Jacobsson | 137/613 X |
| 3,576,193 | 4/1971 | Rothfuss et al. | 137/613 X |
| 3,672,400 | 6/1972 | Scott | 137/614.11 X |
| 3,856,042 | 12/1974 | Fletcher et al. | 137/505.42 |
| 3,921,660 | 11/1975 | Kowalski . | |
| 3,974,879 | 8/1976 | Nelson, Jr. et al. . | |
| 4,096,746 | 6/1978 | Wilson et al. . | |
| 4,250,915 | 2/1981 | Rikuta . | |
| 4,364,111 | 12/1982 | Jocz . | |
| 4,469,304 | 9/1984 | Kah, Jr. . | |
| 4,845,416 | 7/1989 | Scholl et al. . | |
| 4,936,340 | 6/1990 | Potter et al. | 137/485.5 |
| 4,948,565 | 8/1990 | Bemis et al. . | |
| 5,029,065 | 7/1991 | Nau et al. . | |

*Primary Examiner*—Martin P. Schwadron
*Assistant Examiner*—Kevin L. Lee
*Attorney, Agent, or Firm*—Vaden, Eickenroht, Thompson, Boulware & Feather

[57] ABSTRACT

There is disclosed a system for delivering gas at a predetermined rate of flow, including a diaphgram type flow controller, a pressure regulator for providing a constant flow of gas to the flow controller, and a microprocessor controlled stepper motor utilizing an optical encoder to adjust the rate of flow of a gas leaving the controller without having to use a gas flow measurement device to monitor the flow rate.

12 Claims, 4 Drawing Sheets

GAS FLOW CONTROLLER

BACKGROUND OF THE INVENTION

1. Field of the Invention

This invention pertains generally to the control of the flow of gas, and more particularly, to a system which includes an improved diaphragm type gas flow controller.

2. Description of the Prior Art

Precise delivery of gas, the gas flow rate (volume per unit time), is critical to the operation of many laboratory instruments such as gas chromatographs, gas calibration units, and headspace sampling systems. Perhaps the most simple method of adjusting gas flow is by holding the upstream pressure constant against a variable orifice in the gas stream, for example, a needle valve or other type of metering valve, or conversely, changing the upstream pressure against a fixed restriction in the gas stream. If, however, the downstream pressure varies due to changes in downstream restriction or temperature, the gas flow will not remain constant.

Various types of flow controllers have been developed to compensate for changes in downstream pressure by maintaining a constant differential pressure across a restriction integral to the controller or by sensing changes in gas flow and operating a metering valve in the gas stream to compensate for these changes and thereby sustaining a constant flow rate. There are presently three major methods for maintaining constant gas flow for instrumentation.

Probably one of the oldest device is the diaphragm flow controller where upstream and downstream pressure exert an opposing force on a diaphragm. Movement of the diaphragm under these forces opens and closes a valve or nozzle, whose reference position is established by a spring force. Supplying the gas to the downstream sides of the diaphragm establishes a differential pressure across an orifice or restriction in the gas path between the upstream and downstream sides of the diaphragm. If the downstream pressure rises, the diaphragm will move against the spring force until the pre-set differential pressure is reestablished. This gas control method is quite robust and stable over time, but is dependent on a constant upstream gas pressure.

The second type of apparatus for maintaining a constant gas flow is the mass flow controller, where gas flow is sensed by the transfer of heat from an electrically heated element to another element which is part of a resistance bridge or in an even simpler version, where a resistive element changes temperature under the influence of a flowing gas removing heat from that element. In either case, the sensed change in gas flow can, with appropriate amplification of the electrical signal, be used to open or close an electrically operated valve or restrictor to maintain constant gas flow against upstream or downstream changes in gas pressure.

A third apparatus for maintaining a constant gas flow utilizes an electrical sensor to determine the differential pressure across an orifice and to adjust the orifice or valve to deliver a preset differential pressure. Because gas flow is proportional to the square root of differential pressure across an orifice or restriction (by Bernoulli's equation), such a device can be utilized with appropriate factors for individual gases to translate differential pressure directly into gas flow.

These last two methods for controlling gas flow are capable of not only controlling the gas flow but also of yielding an electrical signal that may be used to indicate the magnitude of the gas flow. On the other hand, the diaphragm controller must utilize an external device to measure the gas flow which is set by the spring force against the diaphragm. This force could, of course, be supplied by a load cell integral to the diaphragm controller and the electrical signal could thus be translated by appropriate circuitry into an indication of flow rate. In practice, however, most users of diaphragm flow controllers measure the gas flow with such devices as rotometers, turbine meters, soap film meters, or the like.

An advantage of the diaphragm flow controller not shared by the other two devices is the robust character of a strictly mechanical device. However, the devices used to measure the gas flow, such as the rotameter, bubble meter, and mass flow meter, tend to be inaccurate primarily because they require constant recalibration.

The mass flow controller and the differential pressure sensor, although they do not require gas flow measurement devices, tend also to drift away from accurate calibration due to changes in the electrical characteristics of the sensors with time.

A common fault in all three gas flow controllers is the recalibration required each time a different type of gas is monitored or the monitoring conditions vary.

Therefore, it is an object of the present invention to provide a system having a diaphragm type gas flow controller that does not require constant recalibration or the use of external gas flow measurement devices, is impervious to both the upstream and downstream pressure changes, and automatically accommodates changes in the gas flow being controlled.

SUMMARY OF THE INVENTION

These and other features are accomplished, in accordance with the illustrated embodiment of this invention, by a system for delivering gas at a predetermined rate of flow, which includes a flow controller having a diaphragm forming upstream and downstream chambers connected by a fixed orifice and means for delivering gas at a substantially constant pressure to the upstream chamber of the flow controller. A heating element maintains the gas in the system at a constant temperature. An outlet from the downstream chamber of the flow controller is opened and closed by the diaphragm, which is urged to the closed position by a spring. The force of the spring is selectively adjusted to achieve the predetermined rate of flow without having to use a gas flow measurement device to monitor the flow rate.

In the preferred embodiment of this invention, the means for delivering gas at a constant pressure is a regulator having a diaphragm forming an inlet chamber for receiving gas at a given pressure and an outlet chamber connecting with the upstream chamber of the flow controller and adapted to be opened and closed by the diaphragm. The regulator also includes spring means urging the diaphragm toward closed position with a fixed force. The flow controller and said regulator are contained in a single housing surrounded by the heating element. The means for selectively adjusting the spring force means includes a stem rotatable in opposite directions to adjust the spring force, means for determining a rotative position of the stem representative of a reference point, and means for rotating the stem to another position with respect to the reference point which is representative of the predetermined rate of flow.

A stepper motor is used in conjunction with a microprocessor that is used to determine a number of steps that are required to rotate the stem to achieve the predetermined rate of flow for the gas being controlled, and to actuate said stepper motor to take the number of steps from a predetermined reference point. An optical encoder including an optical pickup and a single slot encoder disk connected to the stem, is monitored by the microprocessor to determine the reference point.

The combination of the diaphragm type flow controller and a diaphragm type pressure regulator into a single unit, adjusted by a microprocessor controlled stepper motor, creates a gas flow controller which does not required constant recalibration, nor a constant external monitoring of the flow rate of the gas into or out of the flow controller.

BRIEF DESCRIPTION OF THE DRAWINGS

In the drawings, wherein like reference characters are used throughout to designate like parts.

DESCRIPTION OF THE PREFERRED EMBODIMENT

Figure 1:
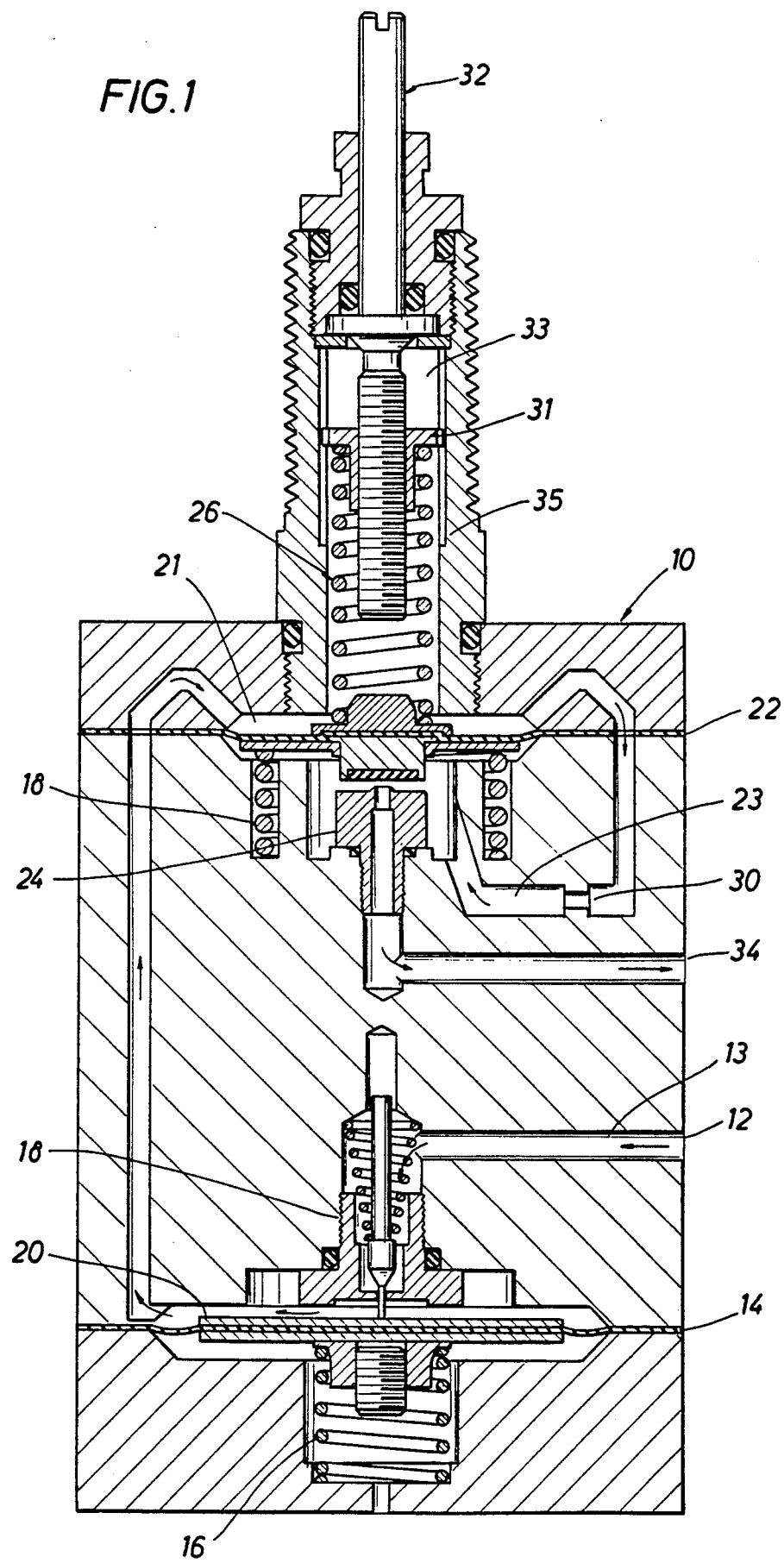
FIG. 1 is a cross-sectional view of the gas flow controller made in accordance with the preferred embodiment of this invention.

Now referring to the drawings and first to FIG. 1, the gas flow controller for the preferred embodiment of this invention is illustrated generally as 10. A gas to be controlled is pumped in at inlet 12 and follows the flow path designated by the arrows. The gas is first passed through a diaphragm type pressure regulator consisting of diaphragm 14 forming inlet chamber 13 and outlet chamber 20, pressure regulator spring 16, and poppet valve 18. Pressure regulator spring 16 applies a fixed spring force against diaphragm 14 which in turn operates poppet valve 18 to produce a constant pressure on the gas in outlet chamber 20.

The gas in outlet chamber 20 is connected with upstream chamber 21 of a diaphragm flow controller which is contained in a single housing with the diaphragm type pressure regulator making one single unit. This diaphragm type flow controller operates in the same manner as a typical diaphragm flow controller, where upstream and downstream pressure exert an opposing force on diaphragm 22 that defines upstream chamber 21 and downstream chamber 23. Movement of diaphragm 22 under the forces opens and closes nozzle 24, supplying gas to outlet 34 from the downstream chamber 23. Bias spring 26 and differential spring 28 are located on the upstream and downstream sides of the diaphragm, respectively, to establish differential pressure across orifice 30 in the gas path between upstream chamber 21 and downstream chamber 23 of diaphragm 22. Operator stem 32 is rotated forcing antirotation flange 31 to travel within cavity 33 to apply a liner displacement force on bias spring 26 to adjust the flow controller to establish a predetermined pressure of the gas flowing through outlet 34. If the downstream pressure rises, the diaphragm 22 will move against the spring force until the predetermined differential pressure is reestablished.

Any upstream pressure greater than pressure produced by the spring force from bias spring 26 will then have little or no effect on the gas flow produced by the flow controller. Gas flow is, thus, immune to both upstream and downstream pressure changes within the following limits. The inlet pressure must be greater than that produced by the pressure regulator spring force, and downstream pressure must be less than that supplied by the pressure regulator minus the highest differential pressure produced by the flow controller.

Figure 2:
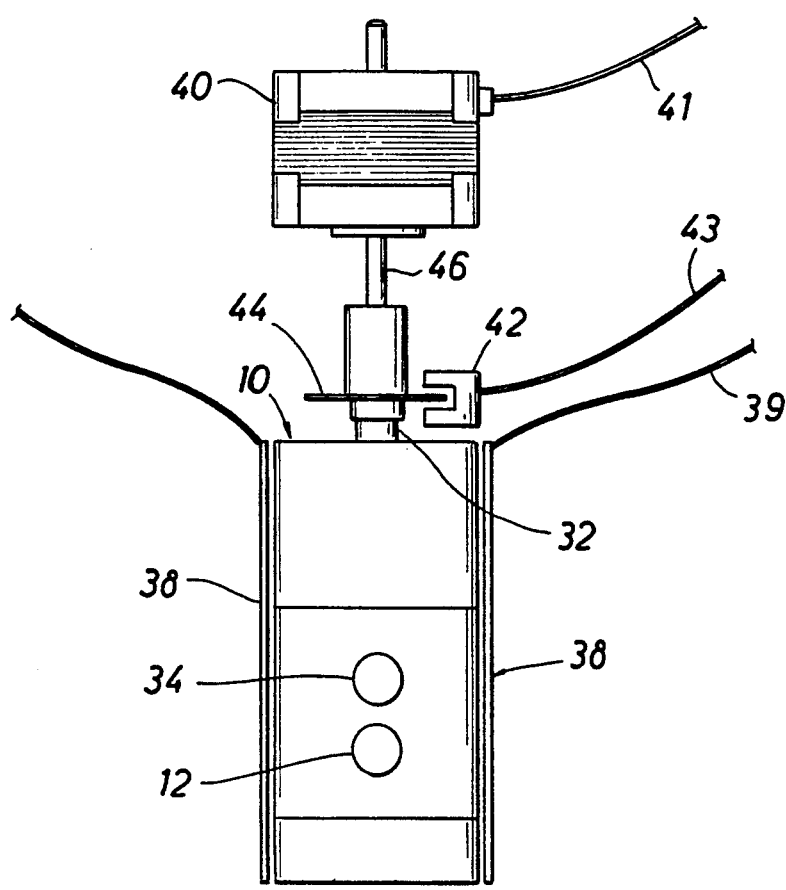
FIG. 2 is a side view of the gas flow controller shown in FIG. 1 attached to a stepper motor controller, arranged in accordance with the preferred embodiment of this invention.

FIG. 2 shows flow controller 10 surrounded by heating element 38, which is used to establish and maintain the gas in flow controller 10 at a constant temperature. Diaphragm type flow controllers are temperature sensitive due, primarily, to the increase in gas viscosity with temperature. Therefore, in the preferred embodiment of the invention, temperature is controlled by maintaining the same temperature during calibration and operation with an externally controlled thermostatted heater well known to those of ordinary skill in the art.

FIG. 2 also shows operator stem 32 of flow controller 10 connected to electrically controlled stepper motor 40. Each step of stepper motor 40 turns operator stem 32 a predetermined amount. However, in order to determine the actual position of operator stem 32, a reference system must be employed. The reference system of the preferred embodiment of this invention is an optical encoder, including optical pickup 42 and encoder disk 44, which is attached to the motor shaft 46 and encoder stem 32. Encoder disk 44 has a single slot equal in width to the angular displacement of one step of stepper motor 40.

Each of the stepper motor 40, optical pickup 42, and heating element 38 are monitored by a microprocessor through cables 41, 43, and 39, respectively. During normal operation, once the predetermined temperature is established, the microprocessor drives the stepper motor in the direction to produce zero gas flow by the controller and then beyond this point where the motor stalls because of a mechanical stop in the flow controller, that is, shoulder 35 in FIG. 1 that limits the downward movement of antirotation flange 31. The microprocessor receives a signal from the encoder disk each time the disk revolves 360°. If the resolution of the stepper motor is 1.8°, one revolution requires 200 steps. If the motor stalls before complete revolution is completed, a signal from the encoder disk is not received. The microprocessor then reverses direction of the stepper motor and drives the stepper motor until a signal is received from the encoder. The position of the encoder when the signal is received, represents the calibration reference point or "home" position. During calibration and operation, flow controller signals from the encoder disk serve to insure that steps have not been missed by the stepper motor or that noise pulses have not been added to the stepper motor positioning of the operator stem, thus insuring continued exact calibration of the unit.

Other methods could be employed to furnish the microprocessor with the information as to the exact position of the operator stem. For instance, a cam and micro switch arrangement, a multiple turn encoder, or two single slot encoder disks that are geared in, for instance, a 10:1 ratio. After initial calibration, the stepper motor position may be placed in a nonvolatile memory and used as a reference point for future gas flow controlling. This method, however, is subject to cumulative error if steps or missed are added during the stepper motor operation.

Figure 3:
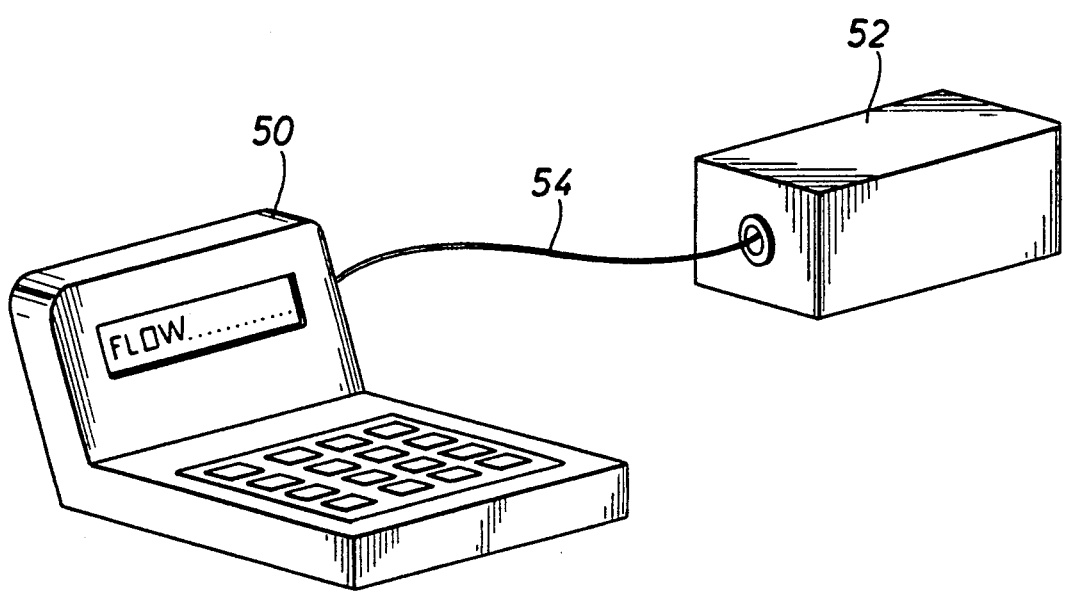
FIG. 3 shows a diagram of the overall automatic gas flow controller system made in accordance with the preferred embodiment of this invention.

FIG. 3 shows the flow controller configuration of the preferred embodiment of this invention. The elements shown in FIG. 2 are contained in housing 52. Cables 41, 43, and 39 are routed through cable 54 to system controller 50 that housed the microprocessor and necessary circuitry. Also incorporated into system controller 50 are a power supply, display, keypad, and the necessary memory required to run the microprocessor, including read only memory (ROM) that stores the software that drives the microprocessor and random access memory (RAM) utilized during operation. All of these components are standard items that could easily be selected and implemented by one of ordinary skill in the art.

Figure 4:
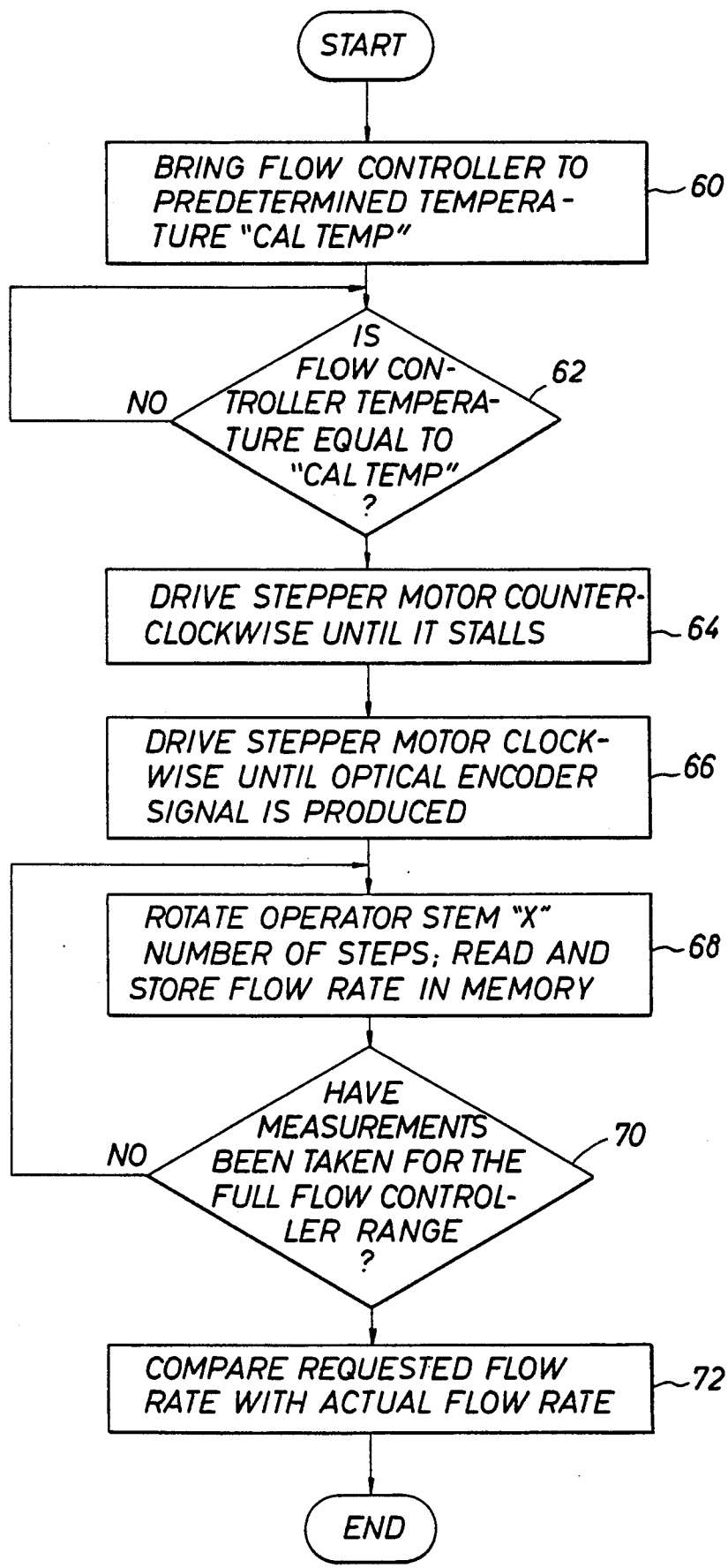
FIG. 4 shows a flow diagram of the program used to calibrate the gas flow controller shown in FIG. 2.

Two computer programs are utilized in the development and use of the flow controller. FIG. 4 shows a calibration program used to calibrate each flow controller prior to use. This program generates a gas flow versus stepper steps curve and identifies the coefficients of the second order curve for each individual flow controller. The coefficients are stored in the ROM along with a number of correction factors for a number of commonly used gases.

Prior to the execution of the program shown in FIG. 4, a flow controller system, such as the one shown in FIG. 3, is connected to a gas source. Nitrogen is typically used, because it is available in fairly pure form at a reasonable cost. Electrical cable 54 disconnected from control unit 50 and is connected to a calibration terminal, a computer, which monitors a positive displacement flow measuring device and controls the operation of the module during calibration. The positive displacement flow measurement device is an external, highly accurate measurement device used only during calibration.

The first step in the calibration program is to bring the temperature of the flow controller to a temperature somewhat above that normally encountered in routine operation, for example, 40° C., Steps 60 and 62.

The Computer then drives the stepper motor counterclockwise until it stalls against the mechanical stop within the flow controller, Step 64. Subsequently, the motor is driven clockwise until the optical encoder produces a signal, Step 66. The signal is generated at or before a full revolution of the operator stem. This is the "home" position upon which the flow calibration is based. The gas flow should be zero at this position, because the force of the bias spring 26 against the diaphragm 22 is still sufficient to overcome the differential spring 28 force plus the differential pressure on the opposite side of diaphragm 22.

Then the computer drives the stepper motor to rotate operator stem 32 clockwise some predetermined number of steps. A flow reading is taken at this point and stored in computer memory, Step 68. This step can be done manually, but is far more easily accomplished by direct digital communication between flow meter and computer. The above procedure is repeated, Step 70, throughout the range of the flow controller to accumulate a sufficient number of flow rate versus stepper motor steps data points to construct a "look-up" table or a well-defined curve, from which any selected flow rate can be obtained at the corresponding steps of the motor from the home position.

Once the necessary data for a table or for coefficients of curve are established, the calibration program then "exercises" the flow controller to obtain a number of flow rates as determined by calculated stepper motor steps, Step 80. These requested flows are compared with flows measured by the positive displacement flow measurement device to determine the accuracy of the calibrated unit. If this comparison is satisfactory, the flow controller operating program together with the calibration numbers is "burned" into a programmable readonly memory (PROM) integrated circuit to be used with the microprocessor stepper motor controller for that individual flow controller module. This PROM is then inserted into the printed circuit board of the flow controller control module.

Figure 5:
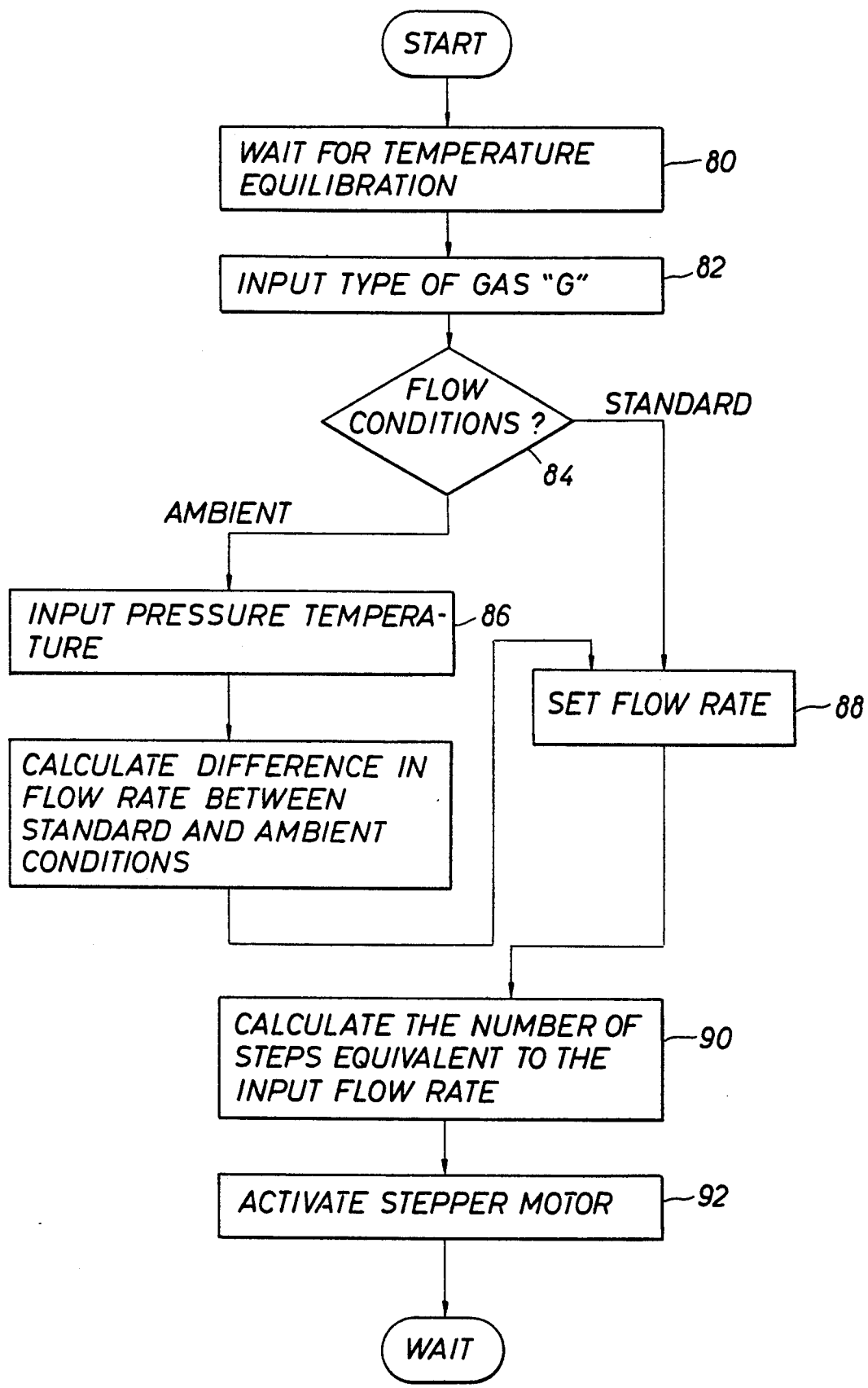
FIG. 5 shows a flow diagram of the program used to deliver a predetermined rate of flow from the calibrated gas flow controller of FIG. 4.

The second program is in each flow controller and is placed in ROM. This program, as shown in FIG. 5, controls the operation of the calibrated flow controller. A user may select options presented on the display including the type of gas controlled, the mode of control, and the flow rate. Once the gas, mode, and flow rate are selected, the stepper motor will position the flow controller operator stem to deliver that exact gas flow rate.

Turning now FIG. 5, when a user activates the calibrated flow controller system as shown in FIG. 3, the control unit displays "Waiting For Temperature Equilibration," Step 80. Once operating temperature is reached, the user is prompted to select gas "G", Step 82. The user depresses the "Enter" key on the keypad, and the display shows, for example, "HYDROGEN." If another gas is required, pressing a menu arrow on the key pad will permit the user to run through a number of common gases, such as hydrogen, helium, oxygen, nitrogen, air, and carbon dioxide until the name of the desired gas shows on the display, or, if a less common gas not in the menu is required, a prompt will finally show to "Set Gas Coefficient." Pressing "Enter" at any of these prompts will select a coefficient to be used in calculating the requisite steps for the stepper motor later in the program.

The user is asked to select "Ambient or Standard Conditions," Step 84. The selection of ambient conditions prompts the user to select the desired ambient temperature and pressure, Step 86. Selection of standard condition will immediately proceed to the next program step, Step 88. The controller converts from standard to ambient condition using the well known gas law equation:

$$PV = nRT \qquad (1)$$

where "P" is pressure, "V" is volume, "n" is Avagadros number, "R" is the gas constant, and "T" is the absolute temperature.

Therefore, it follows that a given gas volume $V_1$, at a certain condition of temperature $T_1$ and pressure $P_1$ is represented as:

$$V_1 = nRT_1/P_1 \qquad (2)$$

and the gas volume $V_2$ at another condition of temperature $T_2$ and pressure $P_2$ may be represented as:

$$V_2 = nRT_2/P_2 \qquad (3)$$

Gas flow, "Q" is defined as volume per unit time Therefore:

$$Q = V/t \tag{4}$$

and $$Q_1 = nRT_1/P_1 t \tag{5}$$

Substituting $Q_1$ and $Q_2$ in equations 2 and 3 and dividing, the resulting equations, then:

$$Q_2 = (P_1 T_2 / P_2 T_1) Q_1 \tag{6}$$

Standard conditions are defined differently by various agencies and authors. Standard pressure is usually taken as atmospheric pressure at sea level at the equator which is taken to be that pressure which will support a column of mercury 760 mm high. Standard temperature has been defined as normal room temperature (70° F. or 21° C.), 15° C., and 0° C. The standard temperature used in the preferred embodiment of the invention is 0° C.

As a consequence of the variability of gas volume and, hence, gas flow rate with ambient conditions, calibrations with any gas measuring device should be referred to standard conditions even though the measurements are made at other prevailing temperatures and pressures, assuming that the temperature and pressure are determined with accurate instruments that are traceable to existing standards defined and maintained by agencies such as the National Institute of Standards and Technology (NIST).

Since standard conditions is 0° C. (273.16° K) and 760 mm of mercury pressure (760 mmHg), then the actual flow at ambient conditions (temperature in °C. and pressure in mmHg) $Q_2$ is:

$$Q_2 = (760/P_2)(273.16 + °C.)/273.17) Q_1 \tag{7}$$

Once the microprocessor makes adjustment for the ambient condition selection if selected, then the computer executes Step 88.

The user is requested to "Set Flow Rate." The desired flow rate is entered, and the microprocessor will calculate the number of steps required to furnish that flow rate from the "look-up" table or calibration curve coefficients together with the other factors, including temperatures and pressures, if necessary, Step 90.

The stepper motor is then activated to move the operator to the required position, Step 92. If, during this movement, a signal or signals from the optical encoder are not received by the microprocessor when expected, for example, if a 1.8° per step stepper motor is employed, this signal should occur every 200 steps from the home position, the display will so indicate to alert the user that an error has occurred and the flow settings should be repeated. This is an unlikely eventuality that nevertheless could happen if the stepper motor misses a step or electrical noise inserts additional steps. Thus, the optical encoder disk assures that calibration integrity is maintained.

If a different flow rate is then requested, the menu driven program will permit the entering of the flow, and the stepper motor, relying on computer memory of its present position, will then be directed by the microprocessor to a new position, again by calculating the required number of steps, clockwise or counter-clockwise from the present position.

If power is turned off or interrupted, upon restoration of power the stepper motor will return to the "home" position. The use of the optical encoder with a disk containing a single slot will always allow the stepper motor to know where it is with respect to the origin of any given revolution.

The following discussion provides an example of the calculations required to produce a requested flow rate of 350 cc/min of helium, at ambient conditions. Prior to calculating the equivalent flow rate of the calibration gas, Nitrogen, a factor "f" for relating helium to the calibration gas, nitrogen, is derived from Bernoulli's equation (flow across a restriction is proportional to the square root of the differential pressure divided by the density of the gas). This factor requires correction for gas compressibility, as well as differences in gas viscosity at a given temperature and is easily performed by one of ordinary skill in the art. The factor f used in this example is 2.464 and was derived empirically. Thus the equivalent flow of nitrogen is:

$$Q_2 = 350/2.464 = 142.0 \tag{8}$$

For an ambient temperature and pressure of 22° C. and 764 mmHg, respectively, the microprocessor calculates the equivalent flow of nitrogen under standard conditions utilizing equations (7) and (8) to be:

$$Q_1 = ((754/760)(273.16/(273.16 + 22)))(142) = 130.4 \tag{9}$$

Then the microprocessor finds a value less than or equal to the required flow, 129.5, from a portion of the look-up table comprised of:

| Number of Step | Flow Rate of Calibration Gas (cc/min) |
| --- | --- |
| 430 | 128.3 |
| 440 | 129.5 |
| 450 | 130.6 |
| 460 | 131.7 |

Interpolation between 129.5 and the next higher value proceeds as follows:

Number of steps = 440 + integral
$$\text{value}[(130.129.5)/(130.6 - 129.5))(10)] = 448 \tag{10}$$

Thus, 448 steps from the home value produces a flow rate of 350 cc/min of helium at the stated ambient conditions.

Many modifications to the above described embodiment can be implemented without departing from the intended scope of the invention. For example, an alternate embodiment of this invention eliminates the heater and the requisite circuitry by continually monitoring the temperature of the flow controller with a temperature sensor and permitting a microprocessor to compensate for any change in temperature. Under the temperature conditions encountered in most applications of this disclosed flow controller (for example, 10° C. to 40° C.) the viscosity-temperature curve is linear, but the slope and intercept of that line will vary from gas to gas. A simple calculation using two coefficients well known to those of ordinary skill in the art, allows for temperature compensation. The correction is applied to the stepper motor periodically to produce an unvarying flow rate regardless of the temperature of the flow controller.

If, in addition to a temperature sensor, a pressure sensor were added to the outlet side of the flow controller, the microprocessor could calculate flow under ambient conditions without necessitating the input of temperature and pressure by the operator.

Another modification to the above described embodiment is the replacement of the stepper motor 40/operator stem 32 combination with any means of capable of generating a linear displacement of bias spring 26.

From the foregoing it will be seen that this invention is one well adapted to attain all of the ends and objects hereinabove set forth, together with other advantages which are obvious and which are inherent to the apparatus. It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter herein set forth or shown in the accompanying drawings to be interpreted as illustrative and not in a limiting sense.

What is claimed is:

1. In a system for delivering gas at a predetermined rate of flow, comprising:
a flow controller having a diaphragm forming upstream and downstream chambers;
means for delivering gas to the upstream chamber of the flow controller at a substantially constant pressure;
said controller having an outlet from the downstream chamber which is opened and closed by the diaphragm;
means connecting the upstream and downstream chambers and having a fixed orifice therein;
spring means urging the diaphragm toward its closed position; and
means for selectively adjusting the spring force to achieve the predetermined rate of flow without having to use a gas flow measurement device to monitor the flow rate.

2. As in claim 1, wherein the means for delivering gas at a constant pressure comprises:
a regulator having a diaphragm forming an inlet chamber for receiving gas at a given pressure, and an outlet chamber connecting with the upstream chamber of the flow controller and adapted to be opened and closed by the diaphragm; and
spring means urging the diaphragm toward closed position with a fixed force.

3. As in claim 2, wherein
said controller and said regulator are contained in a single housing.

4. As in claim 2, additionally comprising
means for maintaining the gas in said system at a constant temperature.

5. As in claim 1, wherein the means for selectively adjusting the spring force comprises:
means including a stem rotatable in opposite directions to adjust the spring force,
means for determining a rotative position of the stem representative of a reference point, and
means for rotating the stem to another position with respect to the reference point which is representative of the predetermined rate of flow.

6. As in claim 5, wherein
said means for rotating the stem is a stepper motor.

7. As in claim 6, additionally comprising:
processing means connected to said stepper motor for determining a number of steps which are required to rotate the stem to achieve the predetermined rate of flow for the gas being controlled and actuating said stepper motor to take the number of steps.

8. As in claim 7, additionally comprising:
means for maintaining the gas in said system at a constant temperature.

9. As in claim 7, additionally comprising:
means for measuring temperature of said flow controller and for producing a signal indicative of the temperature thereof, wherein said processing means monitors the signal and compensates for the difference between the measured temperature and a reference temperature when determining the number of step to rotate the stem.

10. As in claim 6, wherein
said means for determining a rotative position of the stem representative of a reference point, comprises:
an optical encoder including an optical pickup and a single slot encoder disk connected to the stem;
means for limiting downward movement of said rotatable stem; and
a processing means for actuating the stepper motor to rotate the rotatable stem until and stepper motor stalls as it reaches said downward movement limiting means and for monitoring the passage of the single slot by the optical pickup during each revolution of the encoder disk, wherein the last passage of the single slot preceding the stalling of said stepper motor becomes the reference point.

11. For use in a system for delivering gas at a predetermined rate of flow:
a diaphragm type gas flow controller and whose diaphragm is moved by a rotatable stem to a position corresponding to the predetermined rate of flow of the gas leaving the flow controller;
a stepper motor for rotating the rotatable stem;
means for determining a rotative position of the rotatable stem representative of a reference point; and
processing means connected to said stepper motor for determining a number of steps which are required to rotate the stem to achieve the predetermined flow rate of the gas being controlled relative to the reference point and actuating said stepper motor to take the number of steps from the reference point.

12. As in claim 11, wherein
said means for determining a rotative position of the stem representative of a reference point, comprises:
an optical encoder including an optical pickup and a single slot encoder disk connected to the stem;
a means for limiting downward movement of said rotatable stem; and
a processing means for actuating the stepper motor to rotate the rotable stem until and stepper motor stalls as it reaches said limiting means and for monitoring the passage of the single slot by the optical pickup during each revolution of the encoder disk, wherein the last passage of the single slot preceding the stalling of said stepper motor becomes the reference point.

* * * * *